United States Patent
Hong et al.

(10) Patent No.: US 12,195,921 B2
(45) Date of Patent: Jan. 14, 2025

(54) DOUBLE-CROSSLINKED CELLULOSE NANOFIBER FILM WITH HIGH STRENGTH AND HIGH TRANSMITTANCE AND METHOD FOR MANUFACTURING THE SAME

(71) Applicants: HYUNDAI MOTOR COMPANY, Seoul (KR); KIA CORPORATION, Seoul (KR); UNIVERSITY-INDUSTRY COOPERATION GROUP OF KYUNG HEE UNIVERSITY, Yongin-si (KR)

(72) Inventors: Chae Hwan Hong, Seoul (KR); Jin Woo Choung, Suwon-si (KR); Jungmok You, Yongin-si (KR); Kangyun Lee, Suwon-si (KR)

(73) Assignees: HYUNDAI MOTOR COMPANY, Seoul (KR); KIA CORPORATION, Seoul (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 165 days.

(21) Appl. No.: 17/498,483

(22) Filed: Oct. 11, 2021

(65) Prior Publication Data
US 2022/0195669 A1 Jun. 23, 2022

(30) Foreign Application Priority Data
Dec. 21, 2020 (KR) .................. 10-2020-0179681

(51) Int. Cl.
D21H 17/66 (2006.01)
D21H 11/10 (2006.01)
(Continued)

(52) U.S. Cl.
CPC ............ D21H 17/66 (2013.01); D21H 11/10 (2013.01); D21H 21/14 (2013.01); B82Y 40/00 (2013.01)

(58) Field of Classification Search
CPC ........ D21H 17/66; D21H 11/10; D21H 21/14; B82Y 40/00
See application file for complete search history.

(56) References Cited

U.S. PATENT DOCUMENTS

| | | | | |
|---|---|---|---|---|
| 2011/0250256 A1* | 10/2011 | Hyun-Oh | ............... | A61K 47/30 514/357 |
| 2012/0237761 A1* | 9/2012 | Mukai | ...................... | C08K 3/34 428/323 |

(Continued)

FOREIGN PATENT DOCUMENTS

| CN | 103987894 A | * | 8/2014 | ............. D21H 17/00 |
|---|---|---|---|---|
| KR | 20190087226 A | | 7/2019 | |

(Continued)

OTHER PUBLICATIONS

Hyeokjo Gwon et al., A safe and sustainable bacterial cellulose nanofiber separator for lithium rechargeable batteries; PNAS Sep. 24, 2019; www.pnas.org/cgi/doi/10.1073/pnas.1905527116; 6pp.

*Primary Examiner* — Jacob T Minskey
*Assistant Examiner* — Stephen M Russell
(74) *Attorney, Agent, or Firm* — Lempia Summerfield Katz LLC (57) ABSTRACT

A method for manufacturing a cellulose nanofiber film is provided. The method includes preparing cellulose nanofiber dispersion, performing a chemical crosslinking by adding an epichlorohydrin-based material to the cellulose nanofiber dispersion to prepare a planar body and performing physical crosslinking in which a metal chloride is added to the planar body.

8 Claims, 5 Drawing Sheets

(51) Int. Cl.
*D21H 21/14* (2006.01)
*B82Y 40/00* (2011.01)

(56) References Cited

U.S. PATENT DOCUMENTS

| | | | |
|---|---|---|---|
| 2015/0167249 A1* | 6/2015 | Ono | D21H 13/08 |
| | | | 156/62.2 |
| 2016/0017166 A1* | 1/2016 | Zischka | B05D 1/26 |
| | | | 427/508 |
| 2018/0313038 A1* | 11/2018 | Bradbury | D21H 21/22 |
| 2019/0221809 A1 | 7/2019 | Lee et al. | |
| 2019/0237731 A1 | 8/2019 | Park et al. | |
| 2019/0309477 A1 | 10/2019 | Lee et al. | |
| 2020/0052272 A1 | 2/2020 | Park et al. | |

FOREIGN PATENT DOCUMENTS

| | | |
|---|---|---|
| KR | 20190093446 A | 8/2019 |
| KR | 20190117263 A | 10/2019 |
| KR | 20200017863 A | 2/2020 |

\* cited by examiner

DOUBLE-CROSSLINKED CELLULOSE NANOFIBER FILM WITH HIGH STRENGTH AND HIGH TRANSMITTANCE AND METHOD FOR MANUFACTURING THE SAME

CROSS-REFERENCE TO RELATED APPLICATION

This application claims priority to and the benefit of Korean Patent Application No. 10-2020-0179681 filed in the Korean Intellectual Property Office on Dec. 21, 2020, the entire contents of which are incorporated herein by reference.

BACKGROUND

(a) Field of the Disclosure

The present disclosure relates to a cellulose nanofiber film having improved rigidity and a method for manufacturing the same.

(b) Description of the Related Art

Glass is transparent and has a low coefficient of thermal expansion and thus is widely used throughout the industry but has a drawback of being easily broken.

The glass may be replaced with a transparent polymer, for example, PC (polycarbonate), PMMA (polymethylmetacrylate), PET (polyethyleneterephthalate), and the like. However, these transparent polymers are not as strong as glass and are easily deformed. The transparent polymers also do not have as high of a thermal stability as glass. In addition, the glass has a coefficient of thermal expansion of about 7 ppm/K, while the polymer has a coefficient of thermal expansion of about 90 ppm/K, which is disadvantageous compared with the glass.

A method for reducing the high coefficient of thermal expansion of polymer materials has been developed by mixing an inorganic material therewith. For example, there are studies using glass fibers having a micro-size diameter, but the studies reach a current limit due to drawbacks that it is difficult to accurately match refractive indices of the glass fibers and a transparent resin in a visible region. Additionally, as the glass fibers are included, transparency and haze characteristics of a molded article are sharply deteriorated.

On the other hand, cellulose obtained from plant resources is the most abundant natural polymer on earth. Additionally, cellulose has excellent mechanical properties and heat resistance and is environmentally-friendly. For these reasons, cellulose is being studied as an alternative to several petroleum-based polymers.

Cellulose nanofibers have excellent flexibility and modulus and thus are expected to be overcome the drawbacks of the glass fibers when cellulose nanofibers are mixed with the polymers. However, in order to prepare a transparent composite material with a low coefficient of thermal expansion by mixing the cellulose nanofibers with the polymers, a method of improving rigidity of a cellulose nanofiber film in advance is required.

SUMMARY

An embodiment provides a method for manufacturing a cellulose nanofiber film capable of improving rigidity such as tensile strength and modulus and light transmittance of the cellulose nanofiber film without significantly changing the pore structure such as pore size and dispersibility.

Another embodiment provides a cellulose nanofiber film manufactured using the manufacturing methods described herein.

According to an embodiment, a method for manufacturing a cellulose nanofiber film includes preparing a cellulose nanofiber dispersion, performing a chemical crosslinking by adding an epichlorohydrin-based material to the cellulose nanofiber dispersion to prepare a planar body, and performing physical crosslinking in which a metal chloride is added to the planar body.

The epichlorohydrin-based material may include epichlorohydrin, glycine, glutaraldehyde, or a combination thereof.

The epichlorohydrin-based material may be added in an amount in a range of 0.1 parts by weight to 2 parts by weight based on 1 part by weight of the cellulose nanofiber.

The chemical crosslinking may be performed by adding the epichlorohydrin-based material to the cellulose nanofiber dispersion, and then mixing at a temperature in a range of 0° C. to 50° C. for 8 hours to 24 hours.

The planar body may be prepared by filtration under reduced pressure of the cellulose nanofiber dispersion.

The metal chloride may include $CaCl_2$, $MgCl_2$, $AlCl_3$, $FeCl_3$, or a combination thereof.

The metal chloride may be added in an amount in a range of 0.1 part by weight to 1 part by weight based on 1 part by weight of the cellulose nanofiber.

The physical crosslinking may be performed by contacting an aqueous solution including a metal chloride with the planar body at a temperature in a range of 0° C. to 50° C. for 4 hours to 24 hours.

The preparing of the cellulose nanofiber dispersion may include chemically pretreating pulp derived from a plant and fibrillating the pretreated pulp by friction grinding.

The plant that is a raw material for pulp may include lovegrass, bamboo, silver maple tree, tulip tree, trident maple, or a combination thereof.

The cellulose nanofiber may have a diameter in a range of 5 nm to 100 nm.

The method may further include manufacturing a film by post-treatment of the planar body.

The manufacturing of the film may include removing air bubbles in the solution in a vacuum chamber, drying the solution in a thermo-hygrostat, and hot- or cold-pressing.

The cellulose nanofiber film may have a thickness in a range of 25 micrometers (μm) to about 1000 μm.

Another embodiment provides a cellulose nanofiber film manufactured by the method for producing a cellulose nanofiber film as described herein.

The method for manufacturing a cellulose nanofiber film according to an embodiment may improve rigidity and light transmittance such as tensile strength and modulus of the cellulose nanofiber film without significantly changing the pore structure such as pore size and dispersibility.

DETAILED DESCRIPTION

The advantages and features of the present disclosure and the methods for accomplishing the same should be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. The terms defined in a generally-used dictionary may not be interpreted ideally or exaggeratedly unless clearly defined. In addition, unless explicitly described to the contrary, the word "comprise," and variations such as "comprises" or "comprising," should be understood to imply the inclusion of stated elements but not the exclusion of any other elements.

Further, the singular includes the plural unless mentioned otherwise.

According to an embodiment, a method for manufacturing a cellulose nanofiber film includes preparing a cellulose nanofiber dispersion, chemical crosslinking, and physical crosslinking.

Figure 1:
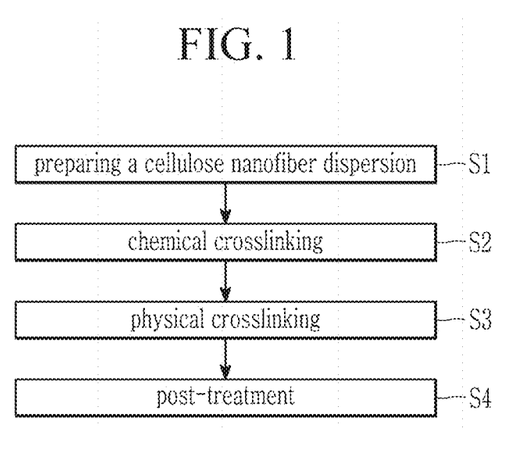
FIG. 1 is a process flow chart showing a method of manufacturing a cellulose nanofiber film according to an embodiment.

FIG. 1 is a process flow chart showing a method of manufacturing a cellulose nanofiber film. Hereinafter, a method of manufacturing a cellulose nanofiber film is described in detail with reference to FIG. 1.

In act S1, a cellulose nanofiber dispersion is prepared.

In certain examples, the preparing of the cellulose nanofiber dispersion may include pretreating the pulp derived from a plant and fibrillating the pretreated pulp.

The pulp derived from a plant may include, for example, wood pulp made from hardwoods and softwoods, non-wood pulp made from straw, bagasse, etc., deinked pulp (DIP) made from wastepaper, shredded paper, etc., and the like. These pulps derived from a plant may be used alone or in a combination of two or more.

The wood pulp may include, for example, chemical pulps such as hardwood kraft pulp (LKP), softwood kraft pulp (NKP), and the like, mechanical pulps (TMP), deinked pulps (DIP), and the like. These wood pulps may be used alone or in a combination of two or more.

Plants from which the pulps are sourced may include lovegrass, bamboo, silver maple tree, tulip tree, trident maple, or a combination thereof.

The pulp derived from a plant may be subjected to pretreatment such as beating and the like, if necessary, prior to fibrillation. This pretreatment may be performed by a physical method, a chemical method, or a physical and chemical method. The pretreatment by a physical or chemical method before the fibrillation may significantly reduce the number of fibrillation acts and amount of energy required for the fibrillation.

The pretreatment by a physical method may use the beating. When the pulp derived from a plant is treated through the beating, raw material fibers are evenly cut, solving a problem that the fibers are entangled with one another and agglomerated. From this point of view, the beating may be carried out until the pulp derived from a plant has freeness of less than or equal to about 120 ml or less than or equal to about 110 ml. The freeness may be measured with reference to Japanese Industrial Standard (JIS) P8121-2 (2012). The beating may be performed by using, for example, a refiner, a beater, or the like.

The pretreatment by a chemical method may include, for example, hydrolysis of polysaccharide by acid (acid treatment), hydrolysis of polysaccharide by enzyme (enzyme treatment), swelling of polysaccharide by alkali (alkali treatment), oxidation of polysaccharide by an oxidizing agent (oxidation treatment), reduction of polysaccharide by a reducing agent (reduction treatment), and the like, for example, performed through a carboxylation or methylation reaction.

For example, the pretreatment by a chemical method may be performed by adding the pulp derived from a plant to an oxidation treatment solution prepared by mixing sodium hypochlorite (NaOCl), sodium bromide (NaBr), and TEMPO. TEMPO ((2,2,6,6-tetramethylpiperidin-1-yl)oxyl) is a type of catalyst, which is commercially available and has water-soluble and safe characteristics.

TEMPO is oxidized into nitrosonium ions under certain conditions and reacts with a hydroxy group (—OH) of carbon No. 6 of the cellulose fibers. This hydroxy group is substituted with a carboxyl group (—COOH) or derivative thereof, or a carboxylate group (—COOM), wherein M is an alkaline metal or an alkaline-earth metal.

A solvent for preparing the oxidation treatment solution may include a polar solvent such as distilled water, methanol, ethanol, isopropanol, butanol, or a combination thereof.

The oxidation treatment may be performed at a pH in a range of 9.5 to 10.5, (e.g., at a pH in a range of 10 to 10.5), for 2 hours to 10 hours, (e.g., for 2 hours to 4 hours). When the oxidation treatment is performed at a pH of less than 9.5, a reaction rate may decrease, as a concentration of the hydroxide group (OH—) of the solution is lowered. Additionally, at the pH less than 9.5, a molecular weight of cellulose fibers may decrease, as an oxidative decomposition reaction is promoted by hypohalite. Further, when the pH is greater than 10.5, a polymer chain may be decomposed by the hydroxide group (OH—). When the oxidation treatment is performed for less than 2 hours, the substitution reaction may proceed to a lesser extent.

In addition, the pretreatment may be performed, in addition to the above methods, for example, by a chemical treatment such as a phosphate esterification treatment, an acetylation treatment, a cyanoethylation treatment, and the like.

The pulp derived from a plant is pretreated and then fibrillated (e.g., refined). Through the fibrillation, the pulp fibers are microfibrillated and become cellulose nanofibers (CNF).

The fibrillation of the pulp derived from a plant may be performed by using a homogenizer (e.g., a high-pressure homogenizer, a high-pressure homogenizing device, and the like), a grinder (e.g., a friction grinder and the like), a mill-type friction machine (e.g., a mill and the like), a refiner (e.g., a conical refiner, a disk refiner, and the like), or a combination thereof.

The cellulose nanofiber dispersion may include 1 wt. % to 3 wt. % of the cellulose nanofibers based on the total weight of the cellulose nanofiber dispersion. When the cellulose nanofibers are included in an amount of less than 1 wt. %, the drying time until a film with a desired thickness is formed gets excessively longer. As a result, efficiency in time, cost, energy, etc. may be deteriorated. Alternatively, when the cellulose nanofibers are included in an amount of greater than 3 wt. %, the cellulose nanofiber dispersion may be agglomerated like a gel due to high viscosity and thus hardly maintain a uniform solution state, causing difficulties in the process.

A solvent for preparing the cellulose nanofiber dispersion may include a polar solvent such as distilled water, methanol, ethanol, isopropanol, butanol, or a combination thereof.

The cellulose nanofibers included in the cellulose nanofiber dispersion may be nano-size fibers having a fiber diameter in a range of 5 nm to 100 nm and a fiber length of 1 μm or less.

Subsequently, in act S2 of a method of manufacturing, a chemical crosslinking is performed by adding an epichlorohydrin-based material to the cellulose nanofiber dispersion.

Figure 2:
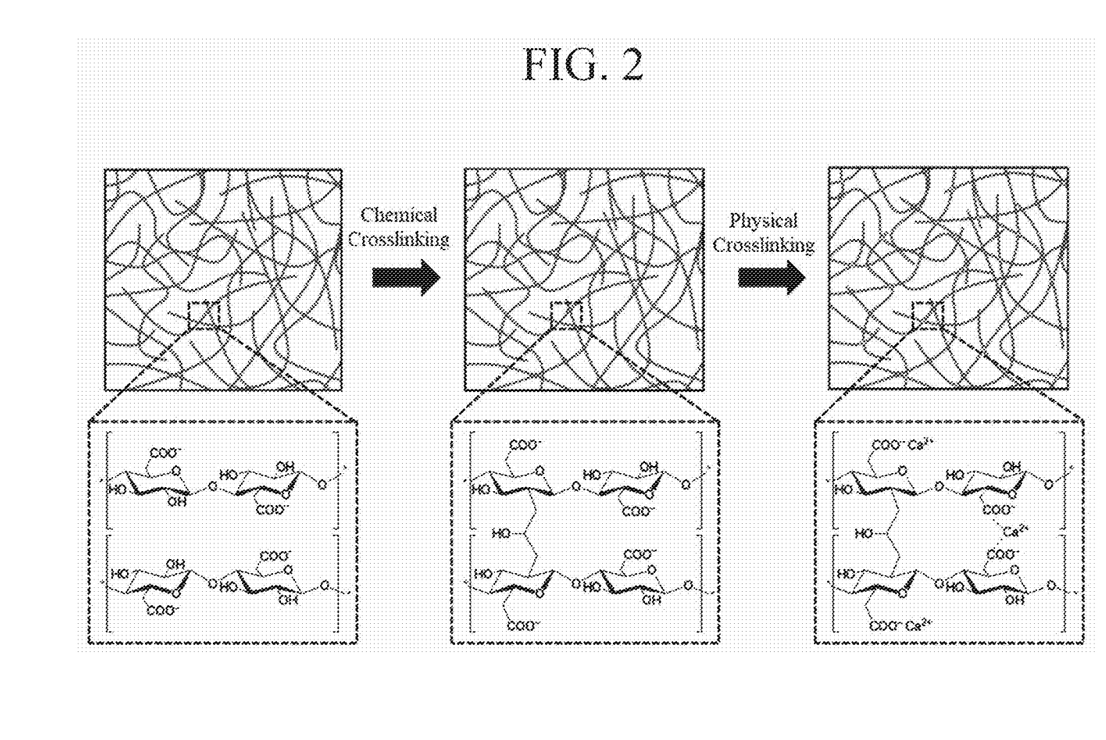
FIG. 2 is a schematic view showing the chemical and physical crosslinking processes of the cellulose nanofiber film according to an embodiment.

FIG. 2 is a schematic view showing the chemical and physical crosslinking process of the cellulose nanofiber film. Referring to FIG. 2, the epichlorohydrin-based material induces a chemical bond between hydroxy groups (—OH) of the cellulose nanofibers.

The epichlorohydrin-based material may use any crosslinking agent capable of inducing the chemical bond between the hydroxy groups (—OH). For example, the crosslinking agent may be epichlorohydrin, glycine, glutaraldehyde, or a combination thereof.

The epichlorohydrin-based material may be added in an amount in a range of 0.1 parts by weight to 2 parts by weight, (e.g., 0.4 parts by weight to 0.7 parts by weight), based on 1 part by weight of the cellulose nanofibers. When the epichlorohydrin-based material is included in an amount less than 0.1 parts by weight, a crosslinking effect may be insufficient. Furthermore, when the epichlorohydrin-based material is included in an amount greater than 2 parts by weight, excessive crosslinking may occur, deteriorating exterior flatness.

The chemical crosslinking in act S2 may be performed for 8 hours to 24 hours, (e.g., 12 hours to 16 hours). When the chemical crosslinking is performed for less than 8 hours, the crosslinking reaction may not sufficiently occur, but when the chemical crosslinking is performed for greater than 24 hours, self-crosslinking between epichlorohydrins may occur. The chemical crosslinking may be performed at a temperature in a range of 0° C. to 50° C. in the air, (e.g., at room temperature in a range of 20° C. to 30° C.).

When the chemical crosslinking is completed, the cellulose nanofiber dispersion is filtered under a reduced pressure, therein obtaining a planar body in a wet state.

Subsequently, in act S3, physical crosslinking may be performed by applying metal chloride to the planar body.

Referring to FIG. 2, when the metal chloride is added to the planar body in a wet state, an ionic bond between ester groups (—COO) of the cellulose nanofibers may be induced by metal inorganic ions, physically cross-linking the cellulose nanofibers.

The metal chloride capable of physically crosslinking the cellulose nanofibers may be $CaCl_2$, $MgCl_2$, $AlCl_3$, $FeCl_3$, or a combination thereof.

The metal chloride may be used in an amount in a range of 0.1 parts by weight to 1 part by weight, (e.g., 0.1 parts by weight to 0.5 parts by weight), based on 1 part by weight of the cellulose nanofibers. When the metal chloride is used in an amount less than 0.1 parts by weight, the crosslinking effect may be insufficient.

The physical crosslinking in act S3 may be performed by making the planar body contact with an aqueous solution including the metal chloride. The physical crosslinking may be performed for 4 hours to 24 hours, (e.g., 6 hours to 12 hours). When the physical crosslinking is performed less than 2 hours, sodium ($Na^+$) ions are not much substituted with metal ions (e.g., $Ca^{2+}$). As a result, mechanical strength may not be as improved as expected. The physical crosslinking may be performed at a temperature in a range of 0° C. to 50° C. in the air, (e.g., at room temperature in a range of 20° C. to 30° C.).

When the physical crosslinking is completed, the planar body is filtered under a reduced pressure filter (e.g., vacuum-filtered), therein obtaining a film shape.

Optionally, a method of manufacturing may further include act S4 that includes a process of post-treating the planar body into a film.

Specifically, the process of forming a film through the post-treatment may include removing air bubbles in the solution in a vacuum chamber, drying the solution in a thermo-hygrostat, and optionally, hot- or cold-pressing.

The removing air bubbles may be performed by, for example, natural defoaming (e.g., stationary) after stirring by using a stirrer with wings or defoaming in a vacuum chamber.

The drying may be a process of semi-drying the cellulose nanofiber film in the thermo-hygrostat at temperature in a range of 20° C. to 60° C., (e.g., 40° C. to 50° C.), under relative humidity in a range of 50% to 90%, (e.g., 80% to 90% relative humidity). When the drying is performed at a temperature less than 20° C. a drying rate may be slower, and when the drying is performed at a temperature greater than 60° C., a shrinkage may occur due to a rapid moisture loss at the high temperature.

In act S4, the forming a film may optionally further include the hot- or cold-pressing the cellulose nanofiber film. For example, the semi-dried cellulose nanofiber film may be thermally compressed at a temperature in a range of 25° C. to 70° C., (e.g., 55° C. to 65° C.), maintaining a flat film shape. When the thermal compression is performed at a temperature less than 25° C., time for the final drying may be longer, but when the thermal compression is performed at a temperature greater than 70° C., discoloring may occur by the high temperature.

Another embodiment provides a cellulose nanofiber film formed by the manufacturing methods described herein.

The prepared cellulose nanofiber film is an environmentally-friendly nanofiber film having excellent mechanical properties and transparency and thus may replace transparent polymers. According to the method for manufacturing, the cellulose nanofiber film may have a thickness in a range of 25 μm to 1000 μm.

The cellulose nanofiber film may be variously used for automotive parts and industrial applications. Specifically, the cellulose nanofiber film may be mixed with polymers and prepared into a transparent composite material with a low coefficient of thermal expansion. The cellulose nanofiber film may replace glass or be applied as a protective film preventing scratching in new cars. Further, the cellulose nanofiber film may be mixed and cured with a specific polymer resin and thus applied as a protector for a display device such as a vehicle navigator and the like.

In addition, the cellulose nanofiber film may be applied to manufacture a large-area, high rigidity, and flat-panel composite products.

Furthermore, the cellulose nanofiber film may be applied to fields such as a separator for separating a specific component from a mixed gas, a separator for a secondary battery, and the like.

Hereinafter, specific embodiments of the disclosure are presented. However, the examples described below are only for specifically illustrating or explaining the disclosure, and the scope of the disclosure is not limited thereto.

Preparation Example: Preparation of Cellulose Nanofiber Film 10 g of cellulose pulp extracted from trees was mixed with 0.16 g of a TEMO catalyst, 1 g of NaBr, and 62 g of 6% NaClO in 1 L of distilled water, and then, pH of the mixed solution was continuously maintained at 10 by using an NaOH solution. When pH of the oxidation solution showed no more change, centrifugation was performed at 4000 rpm for 10 minutes, and then, a process of replacing a supernatant therein with distilled water was three times performed for washing. After performing a chemical pretreatment in a TEMPO oxidation method, cellulose nanofiber dispersion in which 1 wt. % of cellulose nanofiber was dispersed was prepared through 10 times friction grinding process under 1000 bars.

Subsequently, a predetermined amount of epichlorohydrin was mixed with 5 mL of the cellulose nanofiber dispersion and then, reacted for 12 hours and filtered under a reduced pressure (vacuum-filtered), preparing a planar body in a wet state.

Then, the planar body was made to contact with 15 mL of a 0.1 M $CaCl_2$ aqueous solution for 8 hours and then, three times or more washed with distilled water to prepare a wet sheet.

Figure 3:
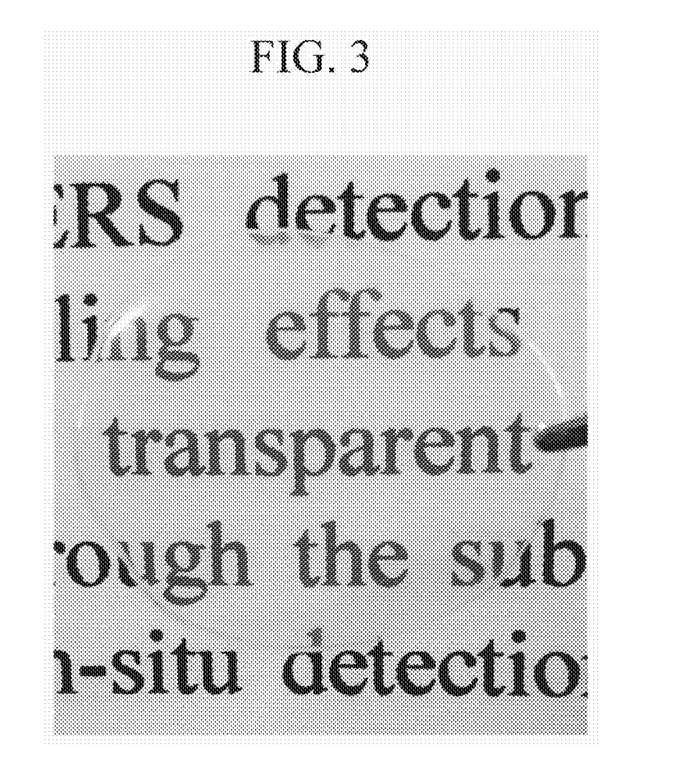
FIG. 3 is a photograph of the cellulose nanofiber film manufactured in preparation example.

The wet sheet was dried in a thermohygrostat at 40° C. under humidity of 90% for 8 days, forming a 31 μm-thick cellulose nanofiber film. A photograph of the cellulose nanofiber film is shown in FIG. 3.

Evaluation Methods

1) Evaluation of Tensile Strength and Modulus

The cellulose nanofiber film was measured with respect to tensile properties at 1 mm/min in Instron 8872. A thickness of the cellulose nanofiber film was obtained by using a micrometer to measure each thickness at 10 positions and averaging the ten measurements.

2) Evaluation of Light Transmittance

Light transmittance of the cellulose nanofiber film was obtained by measuring at 3 points by using Perkin Elmer Lambda 900 UV/VIS/NIR Spectrometer at room temperature and averaging the measurements.

Experimental Example 1: Evaluation of Physical Properties According to Added Content of Chemical Crosslinking Agent A cellulose nanofiber film was respectively formed by changing an amount of epichlorohydrin (ECH) into 0 microliters (μL), 12.5 μL, 25 μL, 50 μL, and 100 μL in the preparation example, and then, the cellulose nanofiber films were evaluated with respect to tensile strength and modulus, and the results are shown in Table 1.

TABLE 1

| | Volume of ECH (μL) | Tensile Strength (MPa) | Elongation at break (%) | Young's Modulus (GPa) |
|---|---|---|---|---|
| Comparative Example 1 | 0 (0 part by weight[1]) | 214.1 | 2.1 | 17.0 |
| Example 1-1 | 12.5 (0.25 parts by weight) | 241.3 | 1.9 | 18.4 |
| Example 1-2 | 25 (0.5 parts by weight) | 298.2 | 2.3 | 20.3 |
| Example 1-3 | 50 (1 part by weight) | 256.5 | 2.0 | 19.9 |
| Example 1-4 | 100 (2 parts by weight) | 235.7 | 1.8 | 18.0 |

[1]Part by weight of epichlorohydrin within Table 1 is defined based on 1 part by weight of cellulose nanofibers Referring to Table 1, the cellulose nanofiber films according to Examples 1-1 to 1-4 exhibited improved tensile strength, compared with the cellulose nanofiber film according to Comparative Example 1, and particularly, the cellulose nanofiberfilm according to Example 1-2 exhibited the most excellent tensile strength and modulus.

Figure 4:
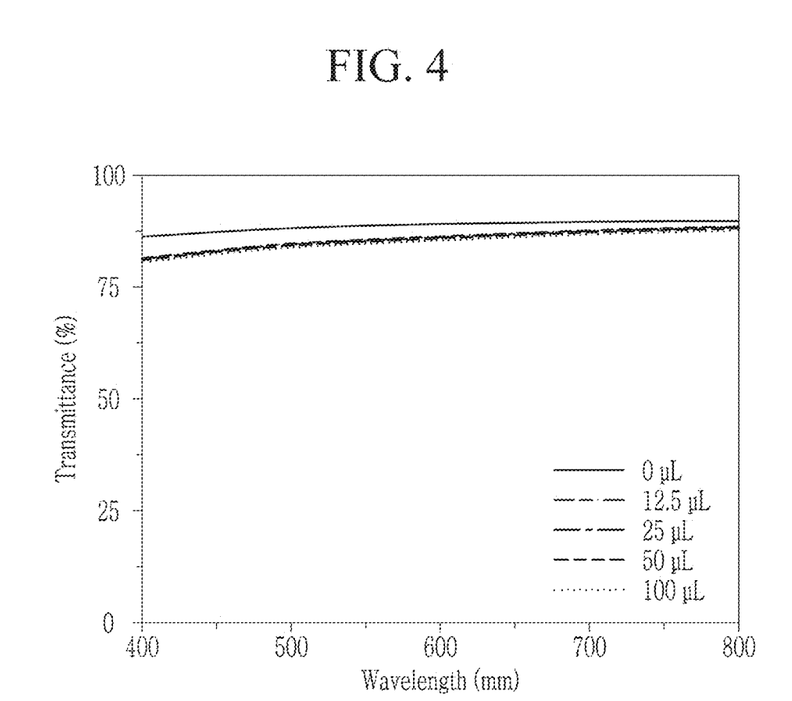
FIG. 4 is a graph showing the light transmittance measurement results of the cellulose nanofiber films manufactured in Comparative Example 1 and Examples 1-1 to 1-4.

In addition, the cellulose nanofiber films according to Comparative Example 1 and Examples 1-1 to 1-4 were evaluated with respect to light transmittance, and the results are shown in FIG. 4.

Referring to FIG. 4, the cellulose nanofiber films according to Examples 1-1 to 1-4 exhibited excellent light transmittance compared with the cellulose nanofiber film according to Comparative Example 1. In addition, the cellulose nanofiber films according to Examples 1-1 to 1-4 exhibited obtained light transmittance of about 86% at 600 nm.

Experimental Example 2: Comparison of Physical Properties with Petroleum-Based Resin Film As viewed from Table 1 above, Example 1-2 provided the test best results.

Figure 5:
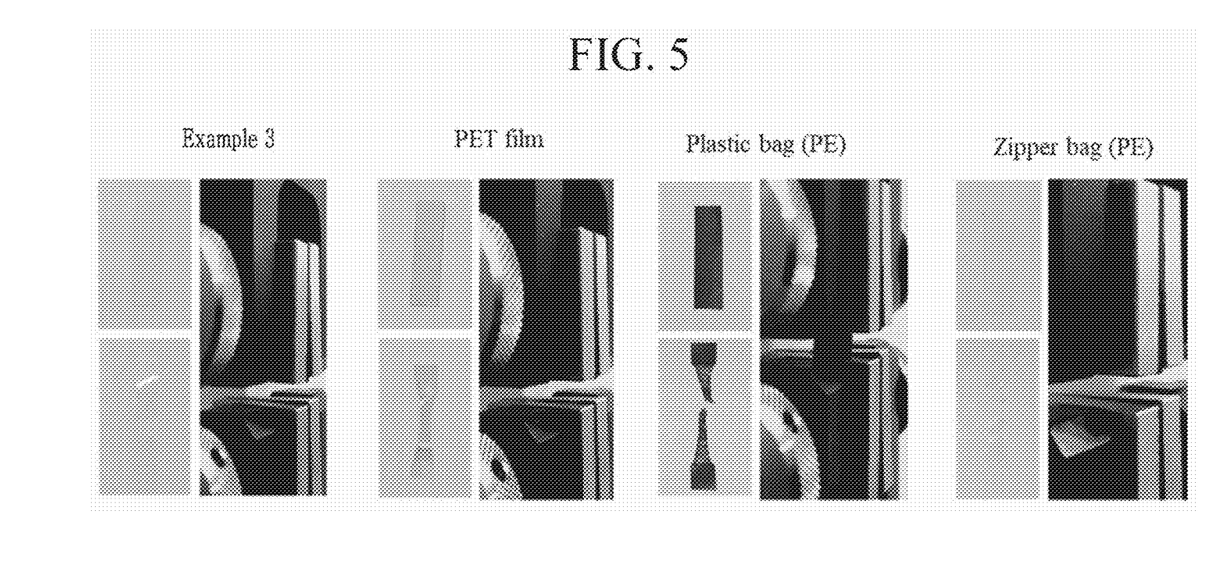
FIG. 5 is a photograph showing the results of comparing the physical properties of the cellulose nanofiber film and the petroleum-based resin film in Experimental Example 3.

Properties of the cellulose nanofiber film (Example 2) formed by applying Example 1-2 and a cellulose nanofiber film (Comparative Example 2) (formed by applying neither chemical crosslinking nor mechanical crosslinking in the preparation example) were compared with those of a commercially available petroleum-based resin film such as a PET film, a plastic bag (black PE), and a zipper bag (PE), and the results are shown in FIG. 5 and Table 2.

TABLE 2

|  | Thickness (μm) | Transmittance at 550 nm (%) | Elongation at break (%) | Tensile Strength (MPa) | Young's Modulus (GPa) |
|---|---|---|---|---|---|
| Comparative Example 2 | 30 | 89 | 2.4 | 189.9 | 14.1 |
| Example 2 | 29 | 86-88 | 2.2 | 303.2 | 19.5 |
| PET film | 127 | 80 | 52.6 | 247.9 | 4.4 |
| Plastic bag (Black PE) | 22 | 2 | 68.4 | 36.4 | 3.3 |
| Zipper bag (PE) | 46 | 80 | 92.6 | 20.6 | 1.1 |

Referring to FIG. 5 and Table 2, the cellulose nanofiber film according to Example 2 exhibited excellent rigidity and light transmission, compared with the commercially available petroleum-based resin films and Comparative Example 2.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A method for manufacturing a cellulose nanofiber film, the method comprising:
    preparing a cellulose nanofiber dispersion having cellulose nanofibers;
    performing a chemical crosslinking by adding an epichlorohydrin-based material to the cellulose nanofiber dispersion to prepare a planar body; and
    performing a physical crosslinking after the chemical crosslinking in which a metal chloride is added to the planar body,
    wherein the epichlorohydrin-based material comprises epichlorohydrin,
    wherein the metal chloride comprises calcium chloride (CaCl$_2$),
    wherein the epichlorohydrin-based material is added in an amount in a range of 0.4 parts by weight to 0.7 parts by weight based on 1 part by weight of the cellulose nanofibers,
    wherein the metal chloride is added in an amount in a range of 0.1 parts by weight to 0.5 parts by weight based on 1 part by weight of the cellulose nanofibers,
    wherein the chemical crosslinking is performed by adding the epichlorohydrin-based material to the cellulose nanofiber dispersion and by then mixing at a temperature in a range of 20° C. to 30° C. for 12 hours to 16 hours, and
    wherein the physical crosslinking is performed by contacting an aqueous solution comprising the metal chloride with the planar body at a temperature in a range of 20° C. to 30° C. for 6 hours to 12 hours.

2. The method of claim 1, wherein the planar body is prepared by filtration under reduced pressure of the cellulose nanofiber dispersion.

3. The method of claim 1, wherein the preparing of the cellulose nanofiber dispersion comprises:
    chemically pretreating pulp derived from a plant; and
    fibrillating the pretreated pulp by friction grinding.

4. The method of claim 3, wherein the plant comprises lovegrass, bamboo, silver maple tree, tulip tree, trident maple, or a combination thereof.

5. The method of claim 1, wherein the cellulose nanofibers have diameters in a range of 5 nm to 100 nm.

6. The method of claim 1, further comprising:
    manufacturing the cellulose nanofiber film by post-treatment of the planar body.

7. The method of claim 6, wherein the manufacturing of the cellulose nanofiber film comprises:
    removing air bubbles in a solution in a vacuum chamber;
    drying the solution in a thermo-hygrostat; and
    hot-pressing or cold-pressing.

8. The method of claim 1, wherein the cellulose nanofiber film has a thickness in a range of 25 micrometers to 1000 micrometers.

* * * * *